United States Patent Office 2,764,559
Patented Sept. 25, 1956

2,764,559

POLYETHERS FROM 1,4-EPOXYCYCLOHEXANE

John P. Wilkins, Grand Island, N. Y., assignor to E. I. du Pont de Nemours and Company, Wilmington, Del., a corporation of Delaware No Drawing. Application March 25, 1952, Serial No. 278,487

4 Claims. (Cl. 260—2)

This invention relates to new polymers and to their preparation.

The high interest in synthetic fibers and films necessarily leads to competition among existing commercial synthetics and to demands for new and better products. Greater resistance to attack by ordinary chemicals and greater heat stability are among the properties sought for in new materials.

Accordingly, it is an object of this invention to provide new polymeric materials and, more particularly, it is an object to provide new polymers which are insoluble in common solvents and which have high melting points. These objects and others appear hereinafter.

These objects are accomplished by polymerizing 1,4-epoxycyclohexane under suitable conditions to produce a polymer which has the structure,

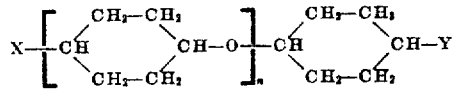

where X and Y, the terminal elements or radicals, depend on the catalyst used in polymerization. Copolymers containing the recurring oxygen and 1,4-cyclohexylidene groups are prepared also in this invention.

The invention will be more clearly understood by reference to the examples and discussion which follow. These examples are given for illustrative purposes only and are not to be construed in any sense as limitative. Parts given below are by weight unless otherwise indicated.

Example I

Into a vessel suitably refrigerated to maintain its contents at a temperature of 0° C., there was introduced 5 parts 1,4-epoxycyclohexane and sufficient catalyst in the form of ferric chloride as a 10% ethyl ether solution and thionyl chloride as a 10% ethyl ether solution to give in the reaction mixture a concentration of 0.03 mole percent of ferric chloride (0.0025 part) and 1.24 mole percent of thionyl chloride (0.075 part) based on the amount of 1,4-epoxycyclohexane initially present. The vessel was closed and its contents maintained at 0° C. for 32 hours after which the contents of the vessel were removed. The solid obtained was ground and slurried in an additional quantity of ethyl ether; the mixture was filtered and the polymer was dried. The dried polymer, obtained in a 74% yield, is believed to have the following structure:

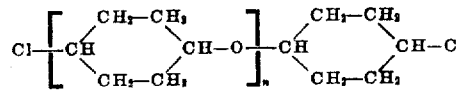

It had an intrinsic viscosity of 0.54 and a melting point above 325° C. It was insoluble in most organic solvents including ethyl alcohol, ethyl ether, acetone, methyl alcohol, petroleum ether, benzene, dimethyl formamide, methanol/chloroform (12/88), o-cresol, anisole, ethylene glycol, ethyl acetate, methyl Cellosolve, N-methylacetamide, dioxane, N-nitrosodimethylamine, acetic acid, tetramethylene cyclic sulfone, paraldehyde, acetylacetone, tetrahydrofuran, tetrachloroethane, coumarin, benzyl benzoate, o-dichlorobenzene, morpholine, dichlorodiethyl ether, nitromethane, nitrobenzene, dowtherm—a eutectic mixture of phenyl ether and diphenyl, formic acid, epichlorohydrin, methanol, oxydipropionitrile, ethylene cyanohydrin, glycerol and 1,3-dichloro-2-propanol. The polymer was soluble only in a mixture of tetrachloroethane and phenol, preferably 66 parts of tetrachloroethane and 100 parts of phenol. Analysis for chlorine showed 0.88% and, assuming the structures above set forth, the approximate molecular weight of this polymer was 8,000.

Other polymers were prepared from the catalysts above and hereinafter mentioned, and under varying conditions of catalyst concentration, ratio and temperature of reaction. Molecular weights of these polymers varied from about 4,000 to about 10,000, intrinsic viscosities being as high as 0.94, and generally all had high melting points, e. g., above 325° C. These several polymers exhibited about the same solubility characteristics as the homopolymer of this example.

Copolymers of 1,4-epoxycyclohexane were prepared with tetrahydrofuran, with epichlorohydrin and with propylene oxide. Some of these had much lower melting points and were more soluble, e. g., some were soluble in toluene, o-dichlorobenzene, dimethylformamide and dowtherm—a eutectic mixture of phenyl ether and diphenyl.

Example II 5 parts of 1,4-epoxycyclohexane, 1.8 parts of tetrahydrofuran, 6.5 parts of o-dichlorobenzene as the solvent for the copolymerizing compounds just mentioned, 0.0068 part of ferric chloride and 0.144 part of succinyl chloride (0.06 mole percent and 1.24 mole percent of ferric and succinyl chloride respectively on the amount of epoxycyclohexane initially present) were introduced into a refrigerated vessel and cooled rapidly to 0° C. The vessel was closed and the polymerization solution maintained at 0° C. for 115 hours, after which the contents of the vessel were removed. The copolymer formed was precipitated from the dichlorobenzene with ethyl ether, filtered, washed with ethyl ether and dried. The copolymer contained a substantial number of tetramethylene oxide units from the tetrahydrofuran, and it had an intrinsic viscosity of 0.75 and a melting point of about 270° C. It was soluble in a number of organic solvents including toluene, o-dichlorobenzene, dimethylformamide and dowtherm—a eutectic mixture of phenyl ether and diphenyl. Self sustaining films were cast from such solutions.

Example III 5 parts of 1,4-epoxycyclohexane, 1.84 parts of tetrahydrofuran, 0.0034 part of ferric chloride and 0.110 part of thionyl chloride were introduced into a refrigerated vessel and after closing the charge was cooled rapidly to −18° C. at which temperature the mixture was held for 480 hours. At the end of this time, the vessel was opened and its contents removed. The copolymer formed contained an appreciable amount of tetramethylene oxide from the tetrahydrofuran, and it had an intrinsic viscosity of 0.94 and a melting point of about 255° C. Its solubility characteristics were substantially those of the copolymer produced according to Example II. From solution it could be cast into self-sustaining film.

Example IV 5 parts of 1,4-epoxycyclohexane, 0.046 part of antimony pentachloride and 0.050 part of succinic anhydride (0.3 mole per cent of antimony pentachloride and 1.0 mole percent of succinic anhydride on the amount of epoxycyclohexane initially present) were introduced into a refrigerated vessel and cooled to 0° C. The vessel was closed and the mixture maintained at 0° C. for 48 hours after which the contents of the vessel were removed and processed as described under Example I. The polymer had an intrinsic viscosity of 0.62 and a melting point above 325° C. Its solubility characteristics were the same as the polymer of Example I.

*Example V*

5 parts of 1,4-epoxycyclohexane, 0.75 part of propylene oxide, 0.0025 part of ferric chloride and 0.075 part of thionyl chloride were introduced into a refrigerated vessel and after closing the charge was cooled to 0° C. Reaction at this temperature was maintained for 21 hours at the end of which time the vessel was opened and its contents removed. After grinding, washing and filtering, the resulting copolymer was found to have an intrinsic viscosity of 0.36 and a melting point above 350° C. It was soluble in the same group of solvents as the copolymers of Examples II and III.

The following table indicates a number of other useful catalysts and the end groups that are formed when these compounds or mixtures are used.

TABLE

| Catalyst | End Group | |
|---|---|---|
| | X | Y |
| R₃O+ (oxonium salt) | RO— | —OH |
| BF₃+1,2 Oxide Compound | HOCCO— | —OH |
| SbCl₅ | HO— | —Cl |
| AlCl₃+CH₃OCH₂Cl | CH₃OCH₂O— | —Cl |
| AlCl₃+HCl | HO— | —Cl |
| FeCl₃+HCl | HO— | —Cl |
| SnCl₄+HCl | HO— | —Cl |
| AlCl₃+CH₃COCl | CH₃CO— (=O) | —Cl |
| FeCl₃+CH₃COCl | CH₃CO— (=O) | —Cl |
| SnCl₄+CH₃COCl | CH₃CO— (=O) | —Cl |
| AlCl₃+SOCl₂ | Cl— | —Cl |
| HClO₄+Acetic anhydride | CH₃C—O— (=O) | —OC—CH₃ (=O) |
| SbCl₅+Acetic anhydride | CH₃CO— (=O) | —OCCH₃ (=O) |
| FeCl₃+Acetic anhydride | CH₃C—O— (=O) | —OC—CH₃ (=O) |

The polymers of this invention may be used for the spinning of filaments or fibers, may be cast into film or may be used in coating compositions. Because of the high melting point and insolubility of the homopolymers, they are especially suited as fiber or film forming materials. Where softer, waxy properties are desired, some of the copolymers containing up to 50% of the other copolymerizing material are well suited.

The 1,4-epoxycyclohexane used in the above experiments may be prepared by dehydrating 1,4-cyclohexanediol.

Polymerization of 1,4-epoxycyclohexane takes place over a wide range of temperatures but polymers of high molecular weight, e. g., over 5,000, can best be made at below room temperature, such as, at 0°C. or less. As shown above, a number of catalysts may be used for instance, boron-trifluoride; ferric chloride and thionyl chloride combinations; antimony chloride and succinic anhydride mixtures; ferric chloride and succinyl chloride mixtures; stannic chloride and acetyl chloride combinations; and the like. The molecular weight and yield of the polymer will vary with the amount and ratio of catalysts used, as well as with the temperature of polymerization and optimum results are obtained very readily by simply adjusting these several factors.

Any departure from the above description which conforms to the present invention is intended to be included within the scope of the claims.

I claim:

1. A new composition of matter comprising a polymeric material having a melting point of at least 325° C. and a molecular weight of between about 4,000 and 10,000 and capable of being formed into shaped articles such as films, said polymeric material containing the following 1,4 unit

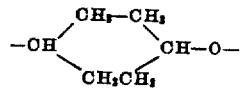

recurring in the polymer chain.

2. A new composition of matter in accordance with claim 1 wherein said polymer is a copolymer of 1,4-epoxycyclohexane and propylene oxide.

3. The composition of matter in accordance with claim 1 wherein said polymer is derived from 1,4-epoxycyclohexane.

4. A new composition of matter comprising a polymer having a melting point of at least 325° C. and having the structure,

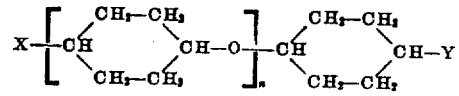

wherein n is of a value to yield a molecular weight of from about 4,000 to 10,000 and X and Y are terminal radicals and is capable of being formed into shaped articles such as films.

References Cited in the file of this patent

UNITED STATES PATENTS

| | | |
|---|---|---|
| 2,054,099 | Rothrock | Sept. 15, 1936 |
| 2,121,695 | Hill | June 21, 1938 |
| 2,187,006 | Alvorado et al. | Jan. 16, 1940 |
| 2,515,758 | Cukier | July 18, 1950 |

UNITED STATES PATENT OFFICE
CERTIFICATE OF CORRECTION

Patent No. 2,764,559 September 25, 1956

John P. Wilkins

It is hereby certified that error appears in the printed specification of the above numbered patent requiring correction and that the said Letters Patent should read as corrected below.

Column 3, line 37, in the table, first column thereof, for "$AlCl_3 + CH_3OCH_3Cl$" read -- $AlCl_3 + CH_3OCH_2Cl$ --.

Signed and sealed this 27th day of November 1956.

(SEAL)
Attest:

KARL H. AXLINE
Attesting Officer

ROBERT C. WATSON
Commissioner of Patents